(12) United States Patent
Kakarala et al.

(10) Patent No.: US 6,819,801 B2
(45) Date of Patent: Nov. 16, 2004

(54) SYSTEM AND METHOD FOR PROCESSING DEMOSAICED IMAGES TO REDUCE COLOR ALIASING ARTIFACTS

(75) Inventors: Ramakrishna Kakarala, Sunnyvale, CA (US); Izhak Baharav, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 709 days.

(21) Appl. No.: 09/885,389

(22) Filed: Jun. 19, 2001

(65) Prior Publication Data

US 2002/0191854 A1 Dec. 19, 2002

(51) Int. Cl.[7] .............................. G06K 9/36; G06K 9/00; G06K 9/40
(52) U.S. Cl. ..................... 382/240; 382/166; 382/269
(58) Field of Search ................................. 382/162, 163, 382/165–167, 240, 269, 254, 255, 275–278, 299, 300, 309; 348/246, 272, 280, 392.1; 358/3.26

(56) References Cited

U.S. PATENT DOCUMENTS

| | | | |
|---|---|---|---|
| 3,971,065 A | | 7/1976 | Bayer .......................... 348/276 |
| 5,065,229 A | * | 11/1991 | Tsai et al. ................. 348/391.1 |
| 5,382,976 A | * | 1/1995 | Hibbard ....................... 348/273 |
| 5,506,619 A | * | 4/1996 | Adams et al. .............. 348/272 |
| 5,778,106 A | | 7/1998 | Juenger et al. ............. 382/275 |
| 5,838,818 A | | 11/1998 | Herley ........................ 382/166 |
| 6,154,493 A | * | 11/2000 | Acharya et al. ........ 375/240.19 |
| 6,404,918 B1 | * | 6/2002 | Hel-or et al. ................ 382/167 |

FOREIGN PATENT DOCUMENTS

| | | |
|---|---|---|
| EP | 1 079 637 A2 | 2/2001 |
| WO | 01/26359 A1 | 4/2001 |

OTHER PUBLICATIONS

Baharav et al., "Compression aware demosaicing methods," Agilent Technologies Labs, 2001, pp. 1–35.*

Marino, F. et al., "A DWT–Based Perceptually Lossless Color Image Compression Architecture", Signal, Systems, and Computers, 1998, pp. 149–153.

Toi, T. et al., "Subband Coding Technique for Image Compression in SIngle CCD Camera with Bayer Color Filter Arrays", IEEE, New York, vol. 45, No. 1, Feb. 1999, pp. 176–180.

(List continued on next page.)

*Primary Examiner*—Mehrdad Dastouri
*Assistant Examiner*—Virginia Kibler (57) ABSTRACT

A system and method is provided for processing a demosaiced image using a color aliasing artifact reduction (CAAR) algorithm in order to reduce color aliasing artifacts. The CAAR algorithm computes the L level wavelet transform for the demosaiced color planes R, G and B. Thereafter, the CAAR algorithm estimates the correct color value at each pixel location for the colors not associated with that pixel location. For example, to determine the green value at red pixel locations, the CAAR algorithm performs an inverse wavelet transform using the green approximation signal and the red detail signals. This process is repeated for each of the colors (e.g., green values at blue pixel locations, red values at green pixel locations, etc.). In addition, the CAAR algorithm performs an inverse wavelet transform on each of the color planes themselves, so that the pixel values of the color associated with each pixel location are not altered. Thereafter, the inverse wavelet transform of each color plane is combined with the inverse wavelet transform of each of the estimated color values for that color plane to produce correlated R, G and B color planes. It is these correlated R, G and B color planes that may later be compressed using a wavelet-based image compression method, such as the JPEG 2000 standard.

20 Claims, 7 Drawing Sheets

OTHER PUBLICATIONS

Diego Santa Cruz and Touradj Ebrahimi; *An analytical study of JPEG 2000 functionalities*; 2000 International Conference on Image Processing (ICIP–2000); Vancouver, Canada on Sep. 10–13, 2000; pp. 1–4.

A.N. Skodras, C.A. Christopoulos and T. Ebrahimi; *JPEG2000: The Upcoming Still Image Compression Standard*; Proceedings of the $11^{th}$ Portuguese Conferecne on Pattern Recognition (RECPA00D 20); Porto, Portugal on May 11–12, 2000; pp. 359–366.

* cited by examiner

SYSTEM AND METHOD FOR PROCESSING DEMOSAICED IMAGES TO REDUCE COLOR ALIASING ARTIFACTS

BACKGROUND OF THE INVENTION

1. Technical Field of the Invention

The present invention relates generally to digital image processing, and specifically to the reduction of color aliasing artifacts in decompressed digital images.

2. Description of Related Art

Demosaicing refers to the process of interpolating colors of a digital image obtained from an image sensor fitted with a color filter array (CFA). One such CFA is described in U.S. Pat. No. 3,971,065 to Bayer (hereinafter referred to as Bayer), which is hereby incorporated by reference. In the Bayer CFA, each pixel sees only one color: red, green or blue. To obtain all three primary colors at a single pixel, it is necessary to interpolate colors from adjacent pixels. This process of interpolation is called demosaicing. Demosaiced images frequently exhibit color aliasing artifacts (distortion) due to the inherent under-sampling of color on an image sensor fitted with a CFA.

Due to the large amount of memory necessary for storing demosaiced images, many applications utilize image compression techniques that represent the demosaiced images with less data in order to save storage costs or reduce transmission time. The greater the compression, the more approximate the decompressed image will be. Compression can be performed using a lossless compression technique or using a lossy technique, such as JPEG (Joint Photographic Experts Group). A discussion of the JPEG technique can be found in: W. Pennebaker and J. Mitchell, "JPEG: Still Image Data Compression Standard," New York: Van Nostrand Reinhold, 1993, which is hereby incorporated by reference.

Previous methods for reducing color aliasing have been designed for discrete cosine transform based JPEG image compression processes (see Pennebaker and Mitchell). However, if the demosaiced image is compressed using wavelets, such as in the JPEG 2000 standard, which is discussed in ISO/IEC 15444-1:2000, *Coding of Still Pictures: JPEG 2000*, Part 1, which is hereby incorporated by reference, the discrete cosine transform color aliasing reduction methods are not suitable for use with wavelet-based compression.

SUMMARY OF THE INVENTION

A system and method is provided for processing a demosaiced image using a color aliasing artifact reduction (CAAR) algorithm in order to reduce color aliasing artifacts. The CAAR algorithm computes the L level wavelet transform for the demosaiced color planes R, G and B. Thereafter, the CAAR algorithm estimates the correct color value at each pixel location for the colors not associated with that pixel location. For example, to determine the green value at red pixel locations, the CAAR algorithm performs an inverse wavelet transform using the green approximation signal and the red detail signals. This process is repeated for each of the colors (e.g., green values at blue pixel locations, red values at green pixel locations, etc.). In addition, the CAAR algorithm performs an inverse wavelet transform on each of the color planes themselves, so that the pixel values of the color associated with each pixel location are not altered. Thereafter, the inverse wavelet transform of each color plane is combined with the inverse wavelet transform of each of the estimated color values for that color plane to produce correlated R, G and B color planes. It is these correlated R, G and B color planes that may later be compressed using a wavelet-based image compression method, such as the JPEG 2000 standard.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS OF THE INVENTION

The numerous innovative teachings of the present application will be described with particular reference to exemplary embodiments. However, it should be understood that these embodiments provide only a few examples of the many advantageous uses of the innovative teachings herein. In general, statements made in the specification of the present application do not necessarily delimit any of the various claimed inventions. Moreover, some statements may apply to some inventive features, but not to others.

Figure 1:
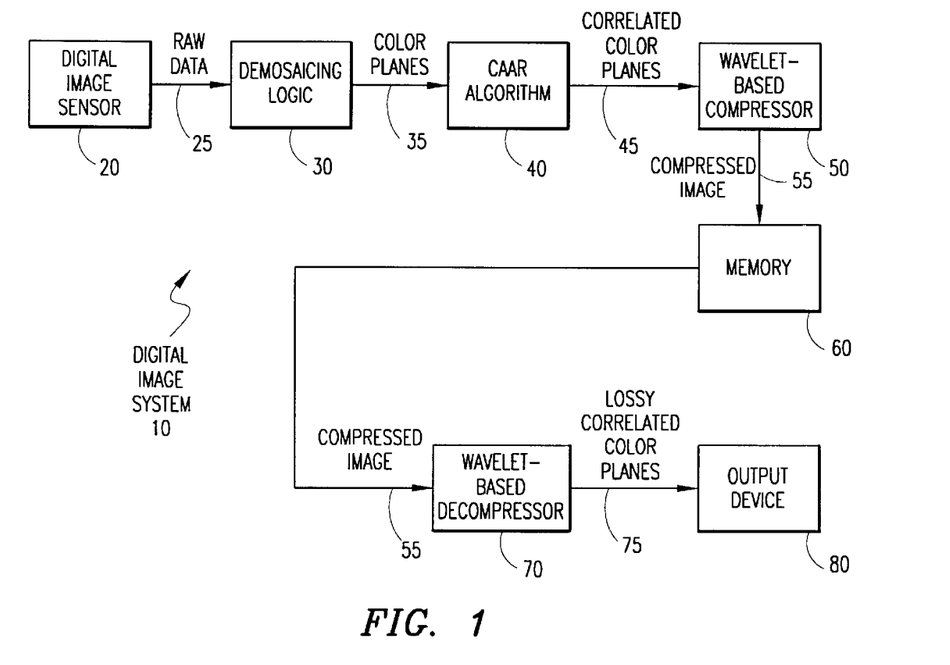
FIG. 1 is a block diagram illustrating a system utilizing the color aliasing artifact reduction (CAAR) algorithm in accordance with the present invention.

FIG. 1 shows a digital image system 10 implementing the color aliasing artifact reduction (CAAR) algorithm 40 in accordance with the present invention. The digital image system 10 can be any digital imaging device, such as a digital camera, video camera, medical imaging device, etc. The digital image system 10 can also be a computer system, such as a personal computer or server, having a memory therein for storing compressed image data. The CAAR algorithm 40 can be a part of an image processing software running on such a personal computer or server.

The digital image system 10 includes a digital image sensor 20, such as a CMOS sensor chip or a CCD sensor chip, for providing raw data 25 containing the original red, blue and green pixel values to demosaicing logic 30, which interpolates the pixel values to obtain red, green and blue values at each pixel location. The result of demosaicing is three color planes (R, G and B), each containing the original values and the interpolated values. For a more complete discussion of demosaicing, reference is made to U.S. Pat. No. 5,838,818 to Herley, which is hereby incorporated by reference. It should also be understood that other color spaces, such as yellow, cyan and magenta, can be used instead of red, blue and green.

The resulting color planes 35 are transmitted to the CAAR algorithm 40, which produces correlated color planes (R', G' and B') 45 (the correlated color planes will be described in more detail below in connection with FIGS. 3A, 3B and 4). Thereafter, if the correlated color planes 45 are to be compressed using a wavelet-based compression method, the correlated color planes 45 are transmitted to a wavelet-based compressor 50, such as one using the JPEG 2000 standard, to compress the correlated color planes 45 into a compressed image 55. This compressed image 55 can be stored in a memory 60 until displayed or processed. To display or process the compressed image 55 on an output device 80 (e.g., a computer screen or printer), the compressed image is first decompressed by a wavelet-based image decompressor 70, which reconstructs lossy correlated color planes (R", G" and B") by inverse wavelet transform. The lossy correlated color planes 75 are output to the output device 80.

As mentioned above, the cause of aliasing in a decompressed image is the under sampling of the original signal. The CAAR algorithm 40 reduces the visibility of aliasing in an image by making appropriate assumptions about the original under-sampled signal, and modifying the under-sampled signal to fit these assumptions. One such assumption is the well-known correlation of details assumption (e.g., up to some level of resolution, the fine details in the red, green, and blue color planes are highly correlated). This assumption means that if a change occurs in one color plane, for example the green plane, then that change also occurs at the same location in the red and blue planes.

Figure 7A:
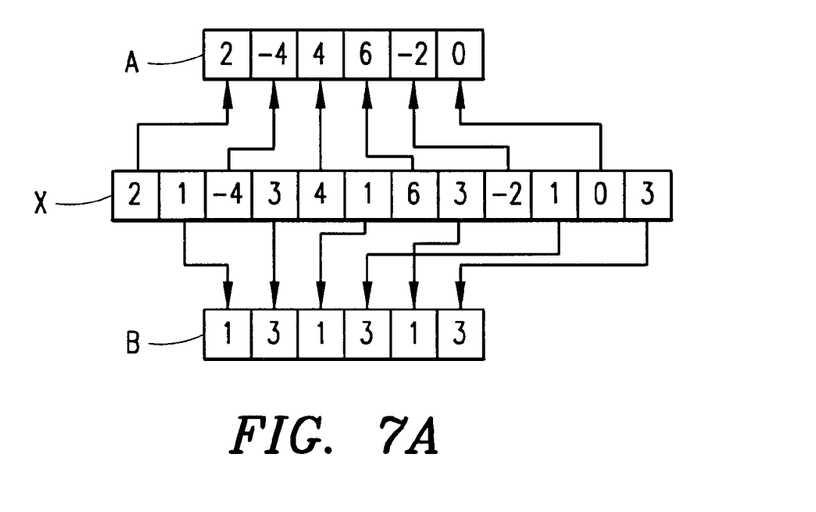
FIGS. 7A and 7B illustrate the process of interpolating values to demonstrate the cause of aliasing in compressed signals.
Figure 7B:
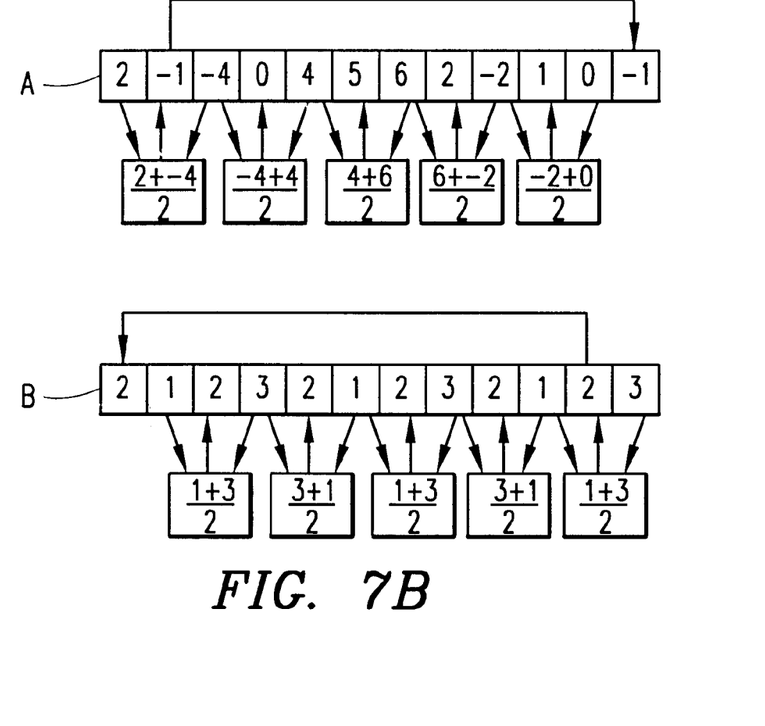

For example, as shown in FIG. 7A, assume a signal "X" has the following sample values: 2, 1, −4, 3, 4, 1, 6, 3, −2, 1, 0 and 3. Also, assume that "X" includes samples of two colors, denoted A and B, with only one color sampled at a time, and that the samples correspond to the colors as follows: A B A B A B A B A B A B. Hence, the A color samples are 2, −4, 4, 6, −2 and 0, and the B color samples are 1, 3, 1, 3, 1, 3. In order to fill in the A and B color values at all sample locations, the signal X can be interpolated in order to determine the missing value between every pair by taking the average of the left and right neighbors. The resulting missing A values are: −1, 0, 5, 2, −1 and −1. Here, the first interpolated value (−1) was used at the end of the missing A values to fill in the entire A values, since interpolating the values does not produce a complete set of A values (i.e., only 11 A values would be produced, instead of the required 12). The resulting missing B values are: 2, 2, 2, 2, 2 and 2. Here, the last interpolated value was used at the beginning of the missing B values to fill in the entire B values. As shown in FIG. 7B, putting all of the A values together, the resulting A color values are: 2, −1, −4, 0, 4, 5, 6, 2, −2, −1, 0 and −1. Putting all of the B values together, the resulting B color values are: 2, 1, 2, 3, 2, 1, 2, 3, 2, 1, 2 and 3.

From the above, it is apparent that the resulting B color values are regular and periodic, while the resulting A values are not. For the correlation of details assumption to be true, both A and B should be periodic or both A and B should not be periodic. Since A is not periodic and B is periodic, the signal "X" has violated the correlation of details assumption, and as a result, aliasing has occurred.

To reduce the visibility of aliasing in "X", the CAAR algorithm 40 presumes that the samples A and B are taken at different locations in the original signal and attempts to correlate the two colors (e.g., by mixing the data from the two colors). Therefore, at every sample location, the original value (either an A or B value) is kept, but the interpolated values are modified to make the two interpolated signals (A missing and B missing) more similar in details (both periodic or both not periodic).

As an example, after applying the CAAR algorithm 40, the resulting correlated A values can be: 2, 0, −4, −1.5, 4, 4, 6, 4.5, −2, −2, 2 and 1.5, and the resulting correlated B values can be: 3, 1, 0.5, 3, 1, 1, 4.5, 3, 1, 1, 3.5 and 3. It is readily apparent that the regularity of the B values has been broken up by the CAAR algorithm 40 to make B look more like A. However, the original A values and the original B values have been maintained.

Thus, the CAAR algorithm 40 has the effect of increasing the correlation in details, thereby reducing the visibility of aliasing. Applying this to an image, the CAAR algorithm 40 has the effect of "graying" the details in the interpolated values (e.g., making the color planes more correlated), without destroying the original sample values.

In order to apply the correlation of details assumption to a demosaiced image, a multi-resolution representation of each of the color planes (R, G and B) must be constructed. Since the color planes contain the interpolated colors at every pixel, each color plane can be considered an image. A multi-resolution representation of an image is obtained by computing its wavelet transform.

A wavelet transform produces a representation of a signal as approximation and detail coefficients. As an example, assume a signal "Z" includes the following sequence of numbers: 10, 1, 23, −2, 0, 1, 0 and 4. To compute the approximation coefficients "A", a first sequence of numbers "A" is produced containing the sum of every pair in "Z". To compute the detail coefficients "D", a second sequence of numbers "D" is produced containing the pairwise differences of each separate pair of "Z". Thus, "A" includes the following numbers: 11, 21, 1 and 4, and "D" includes the following numbers: 9, 25, −1 and −4. It is clear that "Z" is equivalently represented by "A" and "D", since "A" and "D" are computed from "Z", and "Z" can be computed from "A" and "D".

In practice, the approximation coefficients "A" are produced as a weighted sum and the detail coefficients "D" are produced as another weighted sum, each with different weights. For example, if $X(k)$ if the k-th element of X, then for each m, where m is an even number, the approximation coefficients are:

$$A(m)=h(0)\times(m)+h(-1)\times(m-1)+h(-2)\times(m-2)+ \ldots h(N)\times(m+N);$$

$$h(1)\times(m+1)+h(2)\times(m+2)+ \ldots h(N)\times(m+N) \quad \text{(Equation 1)}$$

Similarly, for each n, where n is an even number, the detail coefficients are:

$$D(n)=g(0)\times(n)+g(-1)\times(n-1)+g(-2)\times(n-2)+ \ldots g(-N)\times(n-N);$$

$$g(1)\times(n+1)+g(2)\times(n+2)+ \ldots g(N)\times(n+N) \quad \text{(Equation 2)}$$

The weights $h(-N), \ldots h(-2), h(-1), h(0), h(1), h(2), \ldots h(N)$ for the approximation coefficients and the weights $g(-N), \ldots g(-2), g(-1), g(0), g(1), g(2), \ldots g(N)$ for the detail coefficients are referred to as the wavelet lowpass filter coefficients.

A two-dimensional wavelet transform of an image (signal) is computed by applying the approximation and detail decomposition to each row of pixels of the image, and then to each column of the result. After decomposition, the transform produces four signals, each having a quarter of the size of the original signal and each being made up of a number of coefficients. The first signal is an approximation signal to the original signal (referred to as the approximation signal), the second signal is an approximation horizontally and detail vertically signal (referred to as a vertical edge signal), the third signal is an approximation vertically and detail horizontally signal (referred to as a horizontal edge signal) and the fourth signal is a detail both vertically and horizontally signal (referred to as a diagonal edge signal). For example, a one level wavelet transform of a signal X is denoted:

$$X \xrightarrow{w} \{X_a^0, X_h^0, X_v^0, X_d^0\}. \quad \text{(Equation 3)}$$

Here, $X_a^0$ denotes the approximation signal to X, $X_h^0$ denotes the horizontal edge signal, $X_v^0$ denotes the vertical edge signal, and $X_d^0$ denotes the diagonal edge signal. The edge signals are collectively called the "detail" signals of X.

To obtain a multi-resolution representation of the original signal "X", the wavelet transform is iterated "L" number of times. In each iteration, the wavelet transform operates only on the approximation "A" computed in the previous iteration. Thus, each time the process is repeated, the approximation "$A_{new}$" is computed based on the previous approximation "$A_{previous}$", and the detail signals "D" are computed based on the previous approximation "$A_{previous}$". Therefore, an L-level wavelet transform is denoted:

$$X \xrightarrow{w} \{X_a^L, X_h^L, X_v^L, X_d^L, \ldots, X_h^0, X_v^0, X_d^0\}. \quad \text{(Equation 4)}$$

Applying this to the color planes (R, G and B), the L level wavelet transforms of the red, green, and blue planes from the demosaiced image are as follows:

$$R \xrightarrow{w} \{R_a^L, R_h^L, R_v^L, R_d^L, \ldots, R_h^0, R_v^0, R_d^0\} \quad \text{(Equation 5)}$$
$$G \xrightarrow{w} \{G_a^L, G_h^L, G_v^L, G_d^L, \ldots, G_h^0, G_v^0, G_d^0\} \quad \text{(Equation 6)}$$
$$B \xrightarrow{w} \{B_a^L, B_h^L, B_v^L, B_d^L, \ldots, B_h^0, B_v^0, B_d^0\} \quad \text{(Equation 7)}$$

Applying the correlation of details assumption to the above-listed wavelet transforms of the red, green and blue planes results in the conclusion that for some choice of L, the corresponding detail signals $R_x^l$, $G_x^l$, $B_x^l$ for all $1 \leq L$, and x=h, v, d are very similar, though not identical.

Figure 2:
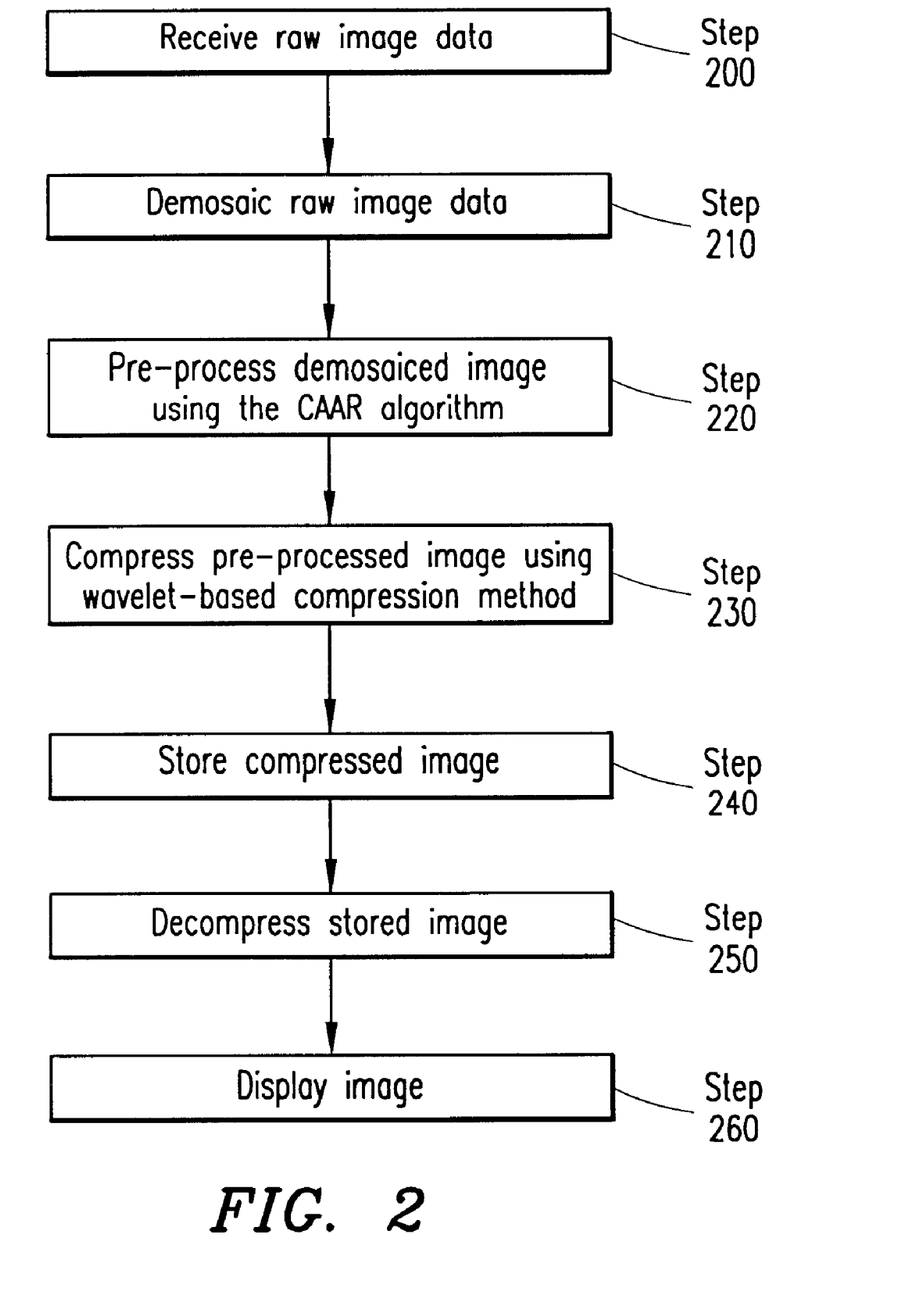
FIG. 2 is a flow chart illustrating the steps for implementing the CAAR algorithm within the system shown in FIG. 1.

FIG. 2 shows the steps for implementing the CAAR algorithm within the digital system (shown in FIG. 1). Raw image data containing the original red, blue and green pixel values are received at the digital image system (step 200), where the red, blue and green values are interpolated to obtain all three colors at each pixel location (step 210). The CAAR algorithm is applied to these three color planes (step 220) to produce the correlated color planes (R', G' and B').

As described above, the correlated color planes (R', G' and B') adhere to the correlation of details assumption in order to reduce aliasing artifacts in the final decompressed image. It is these correlated color planes (R', G' and B') that may be wavelet-based image compressed to produce the compressed image (step 230). The wavelet-based image compression process will be described in detail below with respect to FIGS. 5 and 6. As further described above with respect to FIG. 1, this compressed image is typically stored in a memory (step 240) until the compressed image is decompressed (step 250) in order to display or process the image (step 260). Since the detail coefficients were correlated before compression, the loss (aliasing artifacts) resulting from compression and decompression of the image is less visible than it would have been without the CAAR algorithm.

Figure 3A:
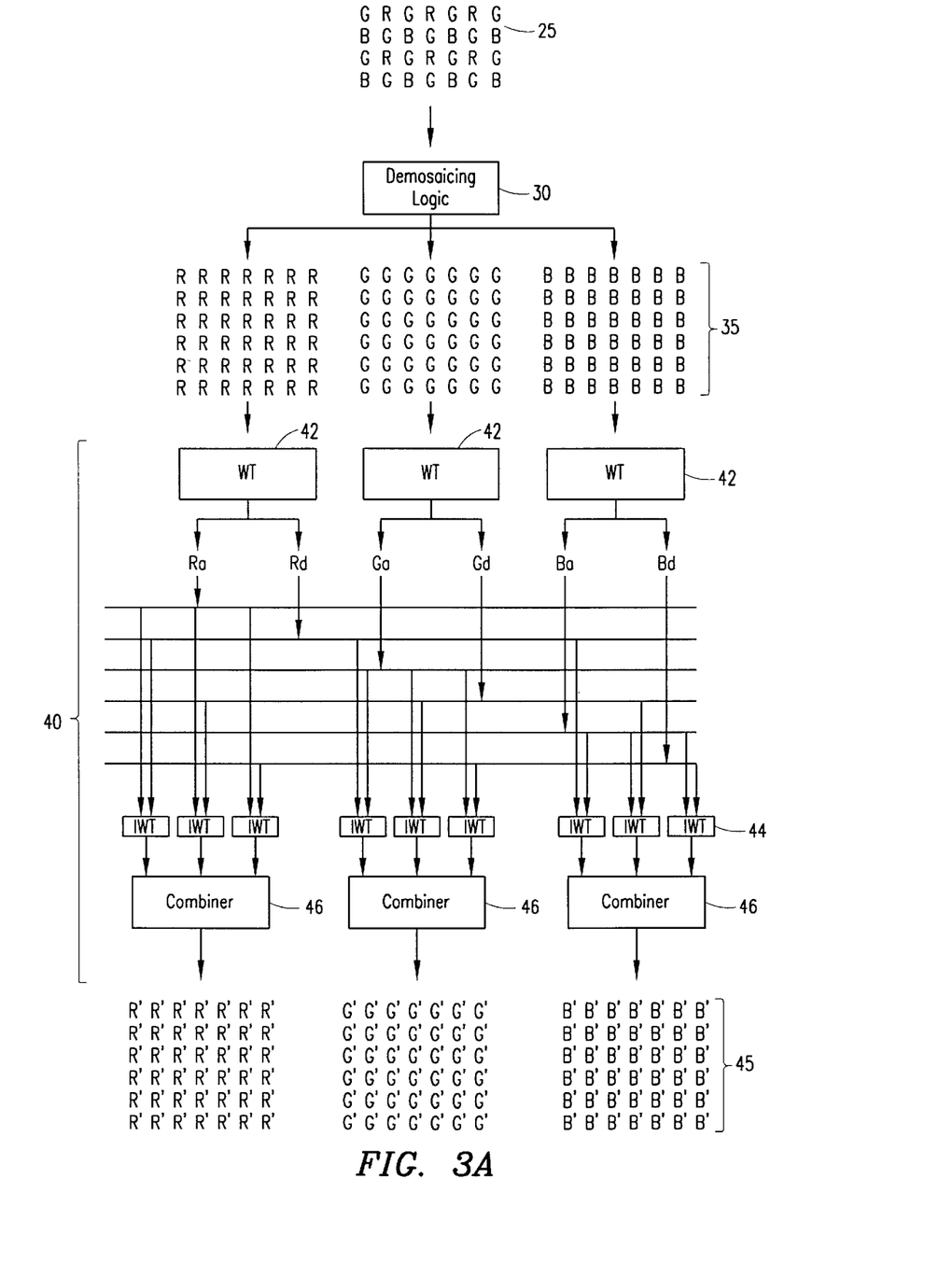
FIG. 3A is a block diagram illustrating the CAAR algorithm in accordance with the present invention.

Reference is now made to FIG. 3A of the drawings, where the CAAR algorithm 40 is explained in greater detail. As discussed above in connection with FIGS. 1 and 2, the raw image data 25 containing the original red, blue and green pixel values is transmitted to demosaicing logic 30, the resulting color planes (R, G and B) 35, each containing the original values and the interpolated values, are transmitted to the CAAR algorithm 40. Initially, the CAAR algorithm 40 computes the L level wavelet transform (as described above) for the demosaiced color planes (R, G and B) 35, using respective wavelet transformers 42. The result of the L level wavelet transform for each color plane 35 is the approximation signal and detail signals (edge signals), as discussed above and illustrated by Equations 5–7. The approximation signals are shown as Ra, Ga and Ba, whereas the detail signals are shown as Rd, Gd and Bd. The effect of increasing L in the CAAR algorithm 40 is to increase the degree of correction for color aliasing. The reason is that as L increases, more of the signal components are being derived from other color planes, increasing the correlation in the output image color planes. The disadvantage of increasing L is the loss of color (i.e., as L increases, the image becomes more desaturated).

Thereafter, the CAAR algorithm 40 estimates the correct color value at each pixel location for the colors not associated with that pixel location by using inverse wavelet transformers 44. For example, to determine the green value at red pixel locations, the CAAR algorithm 40 performs an inverse wavelet transform using the green approximation signal and the red detail signals. This process is repeated for each of the colors (e.g., green values at blue pixel locations, red values at green pixel locations, etc.). In addition, the CAAR algorithm performs an inverse wavelet transform on each of the color planes themselves, so that the pixel values of the color associated with each pixel location are not altered. Thus, for each color plane, three separate inverse wavelet transforms are performed by respective inverse wavelet transformers 44. This process will be explained in greater detail below with respect to FIG. 3B.

Thereafter, a respective combiner 46 for each of the color planes combines the inverse wavelet transform of that color plane with the inverse wavelet transform of each of the estimated color values for that color plane to produce correlated R', G' and B' color planes 45. The combination process will be described in greater detail below with respect to FIG. 4.

Figure 3B:
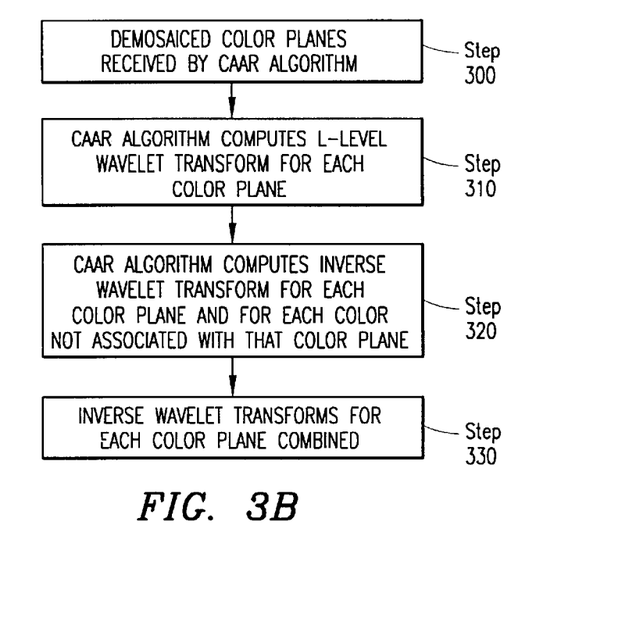
FIG. 3B is a flow chart illustrating exemplary steps of the CAAR algorithm in accordance with the present invention.

Reference is now made to FIG. 3B of the drawings, where exemplary steps for implementing the CAAR algorithm are described. When the CAAR algorithm receives the demosaiced color planes, the CAAR algorithm computes the L level wavelet transform (as described above) for each of the demosaiced color planes (step 300). Thereafter, the CAAR algorithm estimates the correct color value at each pixel location for the colors not associated with that pixel location and for the color associated with that pixel location by performing inverse wavelet transforms (step 310).

For example, the correct green value at red pixel locations is estimated by the following formula:

$$G_r \xleftarrow{w^{-1}} \{G_a^L, R_h^L, R_v^L, R_d^L, \ldots, R_h^0, R_v^0, R_d^0\} \text{(Equation 8)}$$

Here, $G_r$ denotes the green value at red pixel locations, and $\xleftarrow{w^{-1}}$ denotes the inverse wavelet transform. It should be noted that the L-th level green approximation $G_a^L$ is used with detail signals from the red plane to estimate the green value at red pixel locations. Similarly, the green value at blue pixel locations is estimated by the following formula:

$$G_b \xleftarrow{w^{-1}} \{G_a^L, B_h^L, B_v^L, B_d^L, \ldots, B_h^0, B_v^0, B_d^0\} \quad \text{(Equation 9)}$$

The green values at green pixel locations are not altered (i.e., the inverse wavelet transform is applied to the green approximation signal and the green detail signals). The resulting color planes are green, green/blue and green/red. This completes the processing of the green plane. The processing of the red and blue color planes is similar. In each case, the approximation signal is taken from the color to be estimated, and the detail (edge) signals are taken from the color of the pixel location.

Once the estimated color planes are determined (step 320), the inverse wavelet transform of each color plane is combined with the inverse wavelet transform of each of the estimated color values for that color plane to produce correlated R', G' and B' color planes (step 330). An example of a combination process is described below with respect to FIG. 4. It is these correlated R', G' and B' color planes 45 that are compressed using a wavelet-based image compression method, such as the JPEG 2000 standard.

Figure 4:
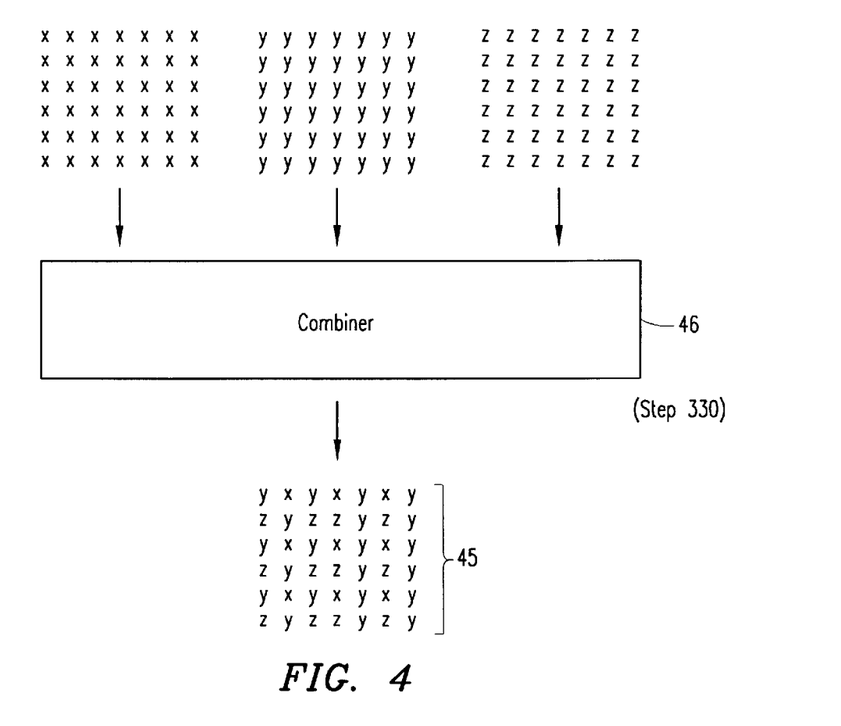
FIG. 4 is a flow diagram illustrating the combination step of the CAAR algorithm shown in FIG. 3 of the drawings.

Reference is now made to FIG. 4 of the drawings for a more complete description of the combination step of the CAAR algorithm shown in FIG. 3A of the drawings. For simplicity, each of the resulting matrices produced by the inverse wavelet transformers of a particular color plane is shown separately as the x, y and z matrices. It should be understood that one of the matrices is the inverse wavelet transform of the color plane itself, and the other two matrices are the inverse wavelet transforms of the estimated color plane at the other pixel locations. It should also be understood that the flow diagram of FIG. 4 applies to each of the color planes (R, G and B). For example, referring now to FIG. 3A, the combiner 46 that produces the red correlated color plane R' takes as input three matrices from the three inverse wavelet transformers 44 associated with the red color plane. The x, y and z matrices of FIG. 4 are these three input matrices.

As can be seen in FIG. 4, the combiner 46 takes three input matrices (x, y and z) and selects values from each of the matrices to form one output matrix (which is either R', B' or G') 45 (step 330). One such selection method is shown in FIG. 4. However, it should be noted that other selection methods (i.e., choices of values from each of the matrices) can be used instead of the particular selection method illustrated. For example, instead of the top row of the output matrix 45 having the form y, x, y, x, the tow row can have the form y, z, y, z or the form y, x, y, z.

Regardless of the selection method used, it should be understood that the combiner 46 keeps the original values, and only selects the interpolated values to form the output matrix. For example, as shown in FIG. 3A, in the original data 25, the top left corner pixel value is a green value. Therefore, the top left corner pixel value of the output matrix (G') 45 is the top left corner green value taken from the inverse wavelet transform of the green approximation signal and green detail signals. Similarly, the bottom left corner of the original data 25 is a blue pixel value. Therefore, the bottom left corner of the output matrix (G') is the bottom left corner value taken from either the inverse wavelet transform of the green approximation signal with the blue detail signals or the inverse wavelet transform of the green approximation signal with the red detail signals.

The CAAR algorithm 40 is designed to take advantage of the use of wavelets for compression in JPEG 2000. Specifically, if JPEG 2000 compression in lossy mode is applied to a CAAR processed image, aliasing artifacts are reduced to a greater extent than if CAAR is used alone. This can be understood as follows. In JPEG 2000, color images are compressed by converting the RGB components to the C1C2C3 color plane. In most cases, when JPEG 2000 compression is operated in lossy mode, the approximation coefficients in the C2 and C3 planes are preserved with even less accuracy than those in the C1 plane. Highly compressed images (at factors of 25:1 or greater) typically appear blurry, because the detail coefficients in C1, C2, and C3 are coarsely quantized, whereas the approximation coefficients are reproduced with greater accuracy.

Consider now the case of a demosaiced image A that has been processed with the CAAR algorithm, yielding a new image B. If JPEG 2000 is used to compress both A and B by the same factor, the loss in compressing image A typically comes at the expense of the detail coefficients in the C1, C2, and C3 planes, whereas the loss in compressing image B is of a significantly different nature. Since CAAR mixes detail coefficients from the different planes together, the detail coefficients in the three color planes in B have greater correlation than those in A. This results in a desaturation of color, leading to less significant values for the C2 and C3 detail coefficients of image B compared with the C2 and C3 detail coefficients of image A. Hence, there is less loss in the C2, C3 detail coefficients of B than in A, and relatively more loss in the C2, C3 approximation coefficients of B than in A. This results in a "smoothing" effect in the reconstructed C2, C3 planes after decompression, which has the effect of reducing color aliasing. However, the "smoothing" is not the same as simple linear shift invariant filtering. Instead, it is similar to wavelet coefficient shrinkage, which tends to smooth the image in uniform regions, while leaving intact the edges between regions.

Figure 5:
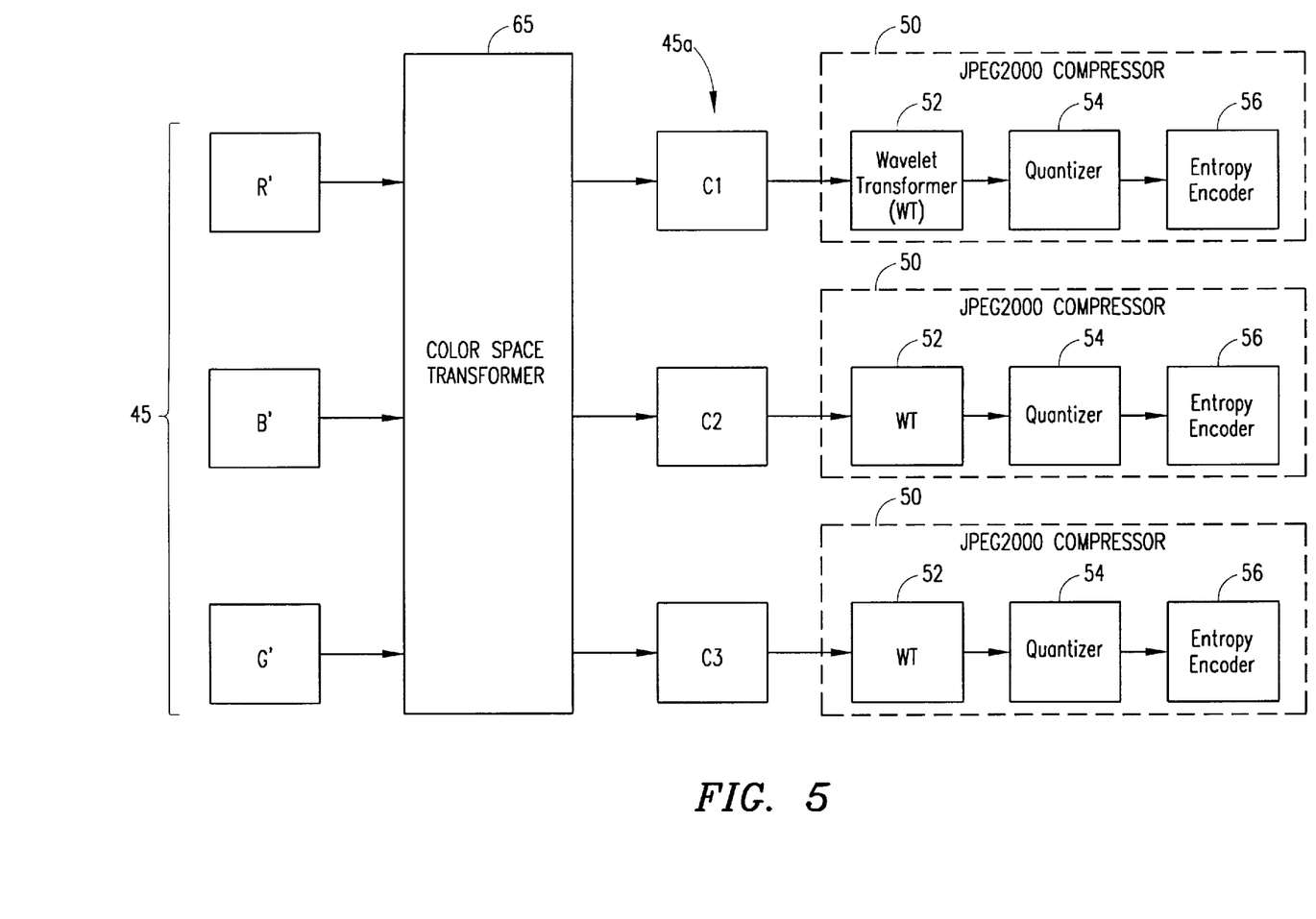
FIG. 5 is a block diagram illustrating the JPEG 2000 standard for wavelet-based image compression.

FIG. 5 shows an exemplary wavelet-based image compressor 50. The correlated color planes (R', B' and G') 45 are first transformed by a color space transformer 65 into a different color space (C1, C2 and C3) 45a. It should be understood that C1C2C3 color space is similar to YCrCb color space, though not equivalent. It should further be understood that other color space transformations may be applicable depending on the particular type of wavelet-based image compression used. In addition, the transformation from RGB color space to C1C2C3 color space can be either reversible or irreversible, depending upon which wavelet is used. There are two wavelets: the "5-3" (or the integer wavelet) and the "9-7" (or the Daubechies wavelet). If the 5-3 wavelet is used, reversible color transform must be used, whereas if the 9-7 wavelet is used, irreversible color transform must be used.

A separate JPEG 2000 encoder 50 is utilized to compress each of the respective color planes (C1, C2 and C3) 45a. Each JPEG 2000 encoder 50 includes a wavelet transformer 52, quantizer 54 and an entropy encoder 56. The wavelet transformer 52 computes the L level wavelet transform (as described above), either reversible or irreversible, for the color planes C1, C2 and C3 45a. The transform coefficients are then quantized by quantization logic 54 and entropy encoded by the entropy encoder 56. The quantizer 54 reduces the coefficients in precision, while the entropy encoder 56 divides the coefficients into code-blocks, which are coded independently using arithmetic coding.

Figure 6:
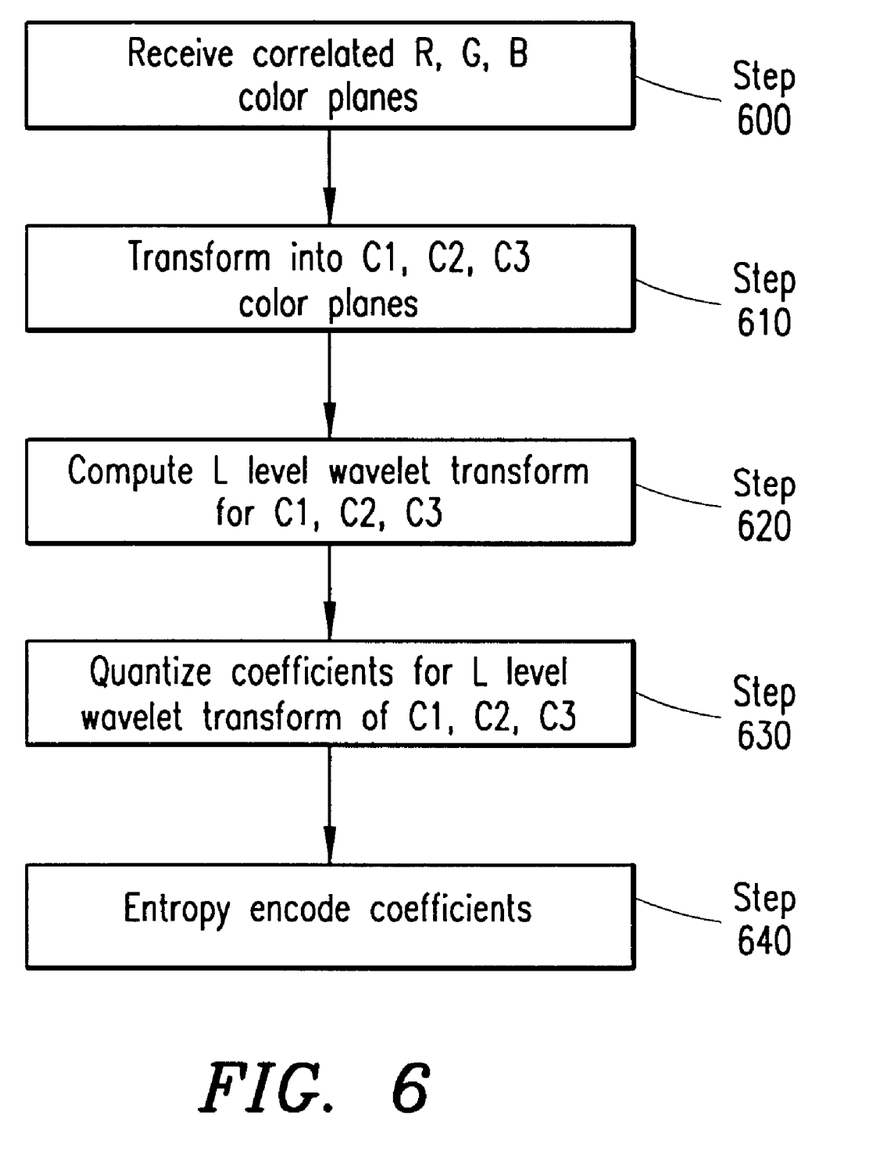
FIG. 6 is a flow chart illustrating the steps involved in the JPEG 2000 standard of FIG. 5.

FIG. 6 illustrates the exemplary steps for compressing the correlated color planes. Once the correlated color planes (R', B' and G') are produced by the CAAR algorithm (step 600), these correlated color planes can be compressed by a wavelet-based image compression method, such as JPEG 2000, to store the compressed image in the memory of FIG. 1. Prior to compressing each correlated color plane, the correlated color planes (R', B' and G') are transformed into a different color space (C1, C2 and C3), as described above (step 610).

To compress the C1, C2 and C3 color planes, the L level wavelet transform, either reversible or irreversible, is computed for each of the color planes C1, C2 and C3 (step 620). Thereafter, the transform coefficients are quantized (step 630), in order to reduce the coefficients in precision, and entropy encoded (step 640), which divides the coefficients into code-blocks that are coded independently using arithmetic coding.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

We claim:

1. A digital image system for processing a demosaiced digital image to reduce color aliasing artifacts, said demosaiced image including color planes, said system comprising:

a wavelet transformer for computing a respective wavelet transform of each of said color planes of said demosaiced digital image, each said wavelet transform including an approximation signal and detail signals;

for each of said color planes, a set of inverse wavelet transformers for computing first detail inverse wavelet transforms using said approximation signal of an associated one of said color planes of said respective set of inverse wavelet transformers and said detail signals of a first different one of said color planes, second detail inverse wavelet transforms using said approximation signal of said associated color plane and said detail signals of a second different one of said color planes and approximation inverse wavelet transforms using said approximation signal and said detail signals of said associated color plane; and for each of said color planes, a combiner connected to said respective set of inverse wavelet transformers for combining each said approximation inverse wavelet transforms with said respective first and second detail inverse wavelet transforms to produce correlated color planes of said color planes.

2. The system of claim 1, wherein each of said approximation inverse wavelet transforms and each of said first and second detail inverse wavelet transforms are represented as input matrices, each of said combiners selecting values from said respective matrices to produce an output matrix corresponding to said associated correlated color plane, said output matrix maintaining original values of said associated color plane and including modified interpolated values of said associated color plane.

3. The system of claim 1, further comprising:

a wavelet-based image compressor for receiving said correlated color planes from said combiner and compressing said correlated color planes using a wavelet-based image compression method to produce a compressed image.

4. The system of claim 3, wherein said wavelet-based image compressor is a JPEG 2000 image compressor.

5. The system of claim 3, further comprising:

a wavelet-based image decompressor for receiving said compressed image and producing lossy correlated color planes from decompressing said compressed image.

6. The system of claim 1, wherein said wavelet transformer comprises a red wavelet transformer for producing a red approximation signal and red detail signals, a green wavelet transformer for producing a green approximation signal and green detail signals and a blue wavelet transformer for producing a blue approximation signal and blue detail signals.

7. The system of claim 6, wherein a first subset of said set of inverse wavelet transformers comprises a red/blue inverse wavelet transformer that receives said red approximation signal from said red wavelet transformer and said blue details signal from said blue wavelet transformer and produces a red/blue color plane, a green/blue inverse wavelet transformer that receives said green approximation signal from said green wavelet transformer and said blue detail signals from said blue wavelet transformer and produces a green/blue color plane and a blue/red inverse wavelet transformer that receives said blue approximation signal from said blue wavelet transformer and said red detail signals from said red wavelet transformer and produces a blue/red color plane.

8. The system of claim 7, wherein a second subset of said set of inverse wavelet transformers comprises a red/green inverse wavelet transformer that receives said red approximation signal from said red wavelet transformer and said green detail signals from said green wavelet transformer and produces a red/green color plane, a green/red inverse wavelet transformer that receives said green approximation signal from said green wavelet transformer and said red detail signals from said red wavelet transformer and produces a green/red color plane and a blue/green inverse wavelet transformer that receives said blue approximation signal from said blue wavelet transformer and said green detail signals from said green wavelet transformer and produces a blue/green color plane.

9. The system of claim 8, wherein a third subset of said set of inverse wavelet transformers comprises a red inverse wavelet transformer that receives said red approximation signal and said red detail signals from said red wavelet transformer and reproduces a red color plane, a green inverse wavelet transformer that receives said green approximation signal and said green detail signals from said green wavelet transformer and reproduces a green color plane and a blue inverse wavelet transformer that receives said blue approximation signal and said blue detail signals from said blue wavelet transformer and reproduces a blue color plane.

10. The system of claim 9, wherein said combiner comprises a red combiner that combines said red/blue color plane, said red/green color plane and said red color plane to produce a red correlated color plane, a green combiner that combines said green/red color plane, said green/blue color plane and said green color plane to produce a green correlated color plane and a blue combiner that combines said blue/red color plane, said blue/green color plane and said blue color plane to produce a blue correlated color plane.

11. A method for processing a demosaiced digital image to reduce color aliasing artifacts, said demosaiced image including color planes, said method comprising:

computing a wavelet transform of each of said color planes of said demosaiced digital image, each said wavelet transform having an approximation signal and detail signals;

for each of said color planes, computing first detail inverse wavelet transforms using said approximation signal of an associated one of said color planes and said detail signals of a first different one of said color planes;

for each of said color planes, computing second detail inverse wavelet transforms using said approximation signal of said associated color plane and said detail signals of a second different one of said color planes;

for each of said color planes, computing approximation inverse wavelet transforms using said approximation signal and said detail signals of said associated color plane; and for each of said color planes, combining each of said approximation inverse wavelet transforms with said respective first and second detail inverse wavelet transforms to produce correlated color planes of said color planes.

12. The method of claim 11, wherein each of said approximation inverse wavelet transforms and each of said first and second detail inverse wavelet transforms are represented as input matrices, said combining further comprising:

for each of said color planes, selecting values from said respective input matrices to produce an output matrix corresponding to said associated correlated color plane, said output matrix maintaining original values of said associated color plane and including modified interpolated values of said associated color plane.

13. The method of claim 11, further comprising:

compressing said correlated color planes using a wavelet-based image compression method.

14. The method of claim 13, wherein said compressing further comprises:

compressing said correlated color planes using a JPEG 2000 image compressor.

15. The method of claim 14, wherein said compressing further comprises:

transforming said correlated color planes into different color space color planes;

computing a wavelet transform for each of said different color space color planes;

quantizing the coefficients of said wavelet transform of each of said different color space color planes; and entropy encoding the coefficients of said wavelet transform of each of said different color space color planes.

16. The method of claim 11, wherein said computing said wavelet transforms further comprises:

producing a red approximation signal and red detail signals;

producing a green approximation signal and green detail signals; and producing a blue approximation signal and blue detail signals.

17. The method of claim 16, wherein computing said first detail inverse wavelet transforms further comprises:

producing a red/blue color plane using said red approximation signal and said blue details signal;

producing a green/blue color plane using said green approximation signal and said blue detail signals; and producing a blue/red color plane using said blue approximation signal and said red detail signals.

18. The method of claim 17, wherein said computing said second detail inverse wavelet transforms further comprises:

producing a red/green color plane using said red approximation signal and said green detail signals;

producing a green/red color plane using said green approximation signal and said red detail signals; and producing a blue/green color plane using said blue approximation and said green detail signals.

19. The method of claim 18, wherein said computing said approximation inverse wavelet transforms further comprises:

reproducing a red color plane using said red approximation signal and said red detail signals;

reproducing a green color plane using said green approximation signal and said green detail signals; and reproducing a blue color plane using said blue approximation signal and said blue detail signals.

20. The method of claim 19, wherein said combining further comprises:

combining said red/blue color plane, said red/green color plane and said red color plane to produce a red correlated color plane;

combining said green/red color plane, said green/blue color plane and said green color plane to produce a green correlated color plane; and combining said blue/red color plane, said blue/green color plane and said blue color plane to produce a blue correlated color plane.

* * * * *